US009689281B2

(12) United States Patent
Cogswell et al.

(10) Patent No.: US 9,689,281 B2
(45) Date of Patent: Jun. 27, 2017

(54) HERMETIC MOTOR COOLING FOR HIGH TEMPERATURE ORGANIC RANKINE CYCLE SYSTEM

(75) Inventors: Frederick J. Cogswell, Glastonbury, CT (US); Bruce P. Biederman, Old Greenwich, CT (US)

(73) Assignee: NANJING TICA AIR-CONDITIONING CO., LTD., Nanjing (CN)

( * ) Notice: Subject to any disclaimer, the term of this patent is extended or adjusted under 35 U.S.C. 154(b) by 1069 days.

(21) Appl. No.: 13/335,053

(22) Filed: Dec. 22, 2011

(65) Prior Publication Data

US 2013/0160450 A1   Jun. 27, 2013

(51) Int. Cl.

| F01K 25/08 | (2006.01) |
|---|---|
| F01K 13/00 | (2006.01) |
| H02K 9/20 | (2006.01) |
| F01K 27/02 | (2006.01) |
| H02K 7/18 | (2006.01) |

(52) U.S. Cl.
CPC ............ *F01K 25/08* (2013.01); *F01K 13/006* (2013.01); *F01K 27/02* (2013.01); *H02K 9/20* (2013.01); *H02K 7/1823* (2013.01)

(58) Field of Classification Search
CPC .......... F01D 11/04; F01D 11/06; F01D 25/22; F01K 3/00; F01K 3/02; F01K 7/24; F01K 25/08; F01K 27/02; F02C 6/16; Y02E 60/15; H02K 7/1823; H02K 9/20; H02K 9/00–9/28; H02K 7/18
USPC ......... 60/505, 643–681; 290/52; 310/54, 58, 310/62, 63
See application file for complete search history.

(56) References Cited

U.S. PATENT DOCUMENTS

| 2,003,000 | A | * | 5/1935 | Kelpe | .............................. 310/57 |
| 2,491,314 | A | * | 12/1949 | Hopkirk | .................. F01K 27/02 |
| | | | | | 290/2 |
| 3,006,163 | A | | 10/1961 | Kooiker | |
| 3,024,366 | A | * | 3/1962 | Yanagimachi | .......... F01D 15/10 |
| | | | | | 290/2 |
| 3,243,961 | A | * | 4/1966 | Caracristi | ....................... 60/646 |

(Continued)

FOREIGN PATENT DOCUMENTS

| DE | 102006004836 | * | 5/2007 | ............... H02K 1/32 |
| DE | 102006004836 A1 | * | 5/2007 | ............... H02K 1/32 |

(Continued)

OTHER PUBLICATIONS

English Translation of DE102006004836 from Espacenet.*

(Continued)

*Primary Examiner* — Laert Dounis
(74) *Attorney, Agent, or Firm* — Oliff PLC

(57) ABSTRACT

An Organic Rankine Cycle system includes a turbine driven by a working fluid and a generator driven by the turbine. The turbine includes a rotor volume that is at sub-atmospheric pressure, and the working fluid is sprayed into the rotor volume. The turbine can be arranged in a primary circuit that also includes, in flow series from the turbine, a condenser, a first pump, and an evaporator. The rotor volume can be arranged in a secondary cooling circuit that includes, in flow series from the rotor volume, a heat exchanger, a second pump, and a restriction valve located downstream of the second pump and upstream of the rotor volume.

14 Claims, 4 Drawing Sheets

(56) References Cited

U.S. PATENT DOCUMENTS

| | | | | |
|---|---|---|---|---|
| 3,740,057 A * | 6/1973 | Doyle et al. | | 60/682 |
| 3,913,346 A * | 10/1975 | Moody, Jr. | | F04C 29/042 |
| | | | | 62/197 |
| 4,301,375 A * | 11/1981 | Anderson | | F03G 7/05 |
| | | | | 290/1 R |
| 4,362,020 A * | 12/1982 | Meacher et al. | | 60/657 |
| 4,363,216 A * | 12/1982 | Bronicki | | F01D 25/22 |
| | | | | 184/6.22 |
| 4,471,621 A * | 9/1984 | Amir | | F01D 25/32 |
| | | | | 60/657 |
| 5,743,094 A * | 4/1998 | Zimron et al. | | 60/646 |
| 5,946,925 A | 9/1999 | Williams et al. | | |
| 6,065,297 A | 5/2000 | Tischer et al. | | |
| 6,240,730 B1 * | 6/2001 | Thiele | | F01D 15/10 |
| | | | | 60/646 |
| 6,424,062 B1 * | 7/2002 | Adelmann | | H02K 9/193 |
| | | | | 310/53 |
| 6,857,266 B2 | 2/2005 | Dick | | |
| 6,964,168 B1 * | 11/2005 | Pierson et al. | | 60/670 |
| 7,100,380 B2 | 9/2006 | Brasz | | |
| 7,633,193 B2 | 12/2009 | Masoudipour et al. | | |
| 7,730,713 B2 * | 6/2010 | Nakano | | F01D 15/10 |
| | | | | 310/52 |
| 8,534,039 B1 * | 9/2013 | Pierson et al. | | 60/728 |
| 9,083,215 B2 * | 7/2015 | Tsuboi | | H02K 7/1823 |
| 2005/0247061 A1 | 11/2005 | Zimron | | |
| 2006/0185366 A1 * | 8/2006 | Kahlbau | | F01K 7/18 |
| | | | | 60/645 |
| 2007/0035137 A1 * | 2/2007 | Matsukuma | | F01D 15/10 |
| | | | | 290/52 |
| 2007/0120427 A1 * | 5/2007 | Iund et al. | | 310/54 |
| 2008/0012437 A1 * | 1/2008 | Kabata | | H02K 9/10 |
| | | | | 310/54 |
| 2008/0246281 A1 * | 10/2008 | Agrawal et al. | | 290/52 |
| 2008/0250789 A1 * | 10/2008 | Myers et al. | | 60/645 |
| 2008/0252078 A1 * | 10/2008 | Myers et al. | | 290/52 |
| 2010/0300093 A1 * | 12/2010 | Doty | | 60/670 |
| 2011/0239650 A1 * | 10/2011 | Amedick | | F01D 25/12 |
| | | | | 60/670 |
| 2012/0067049 A1 * | 3/2012 | Woolley | | F01K 25/10 |
| | | | | 60/671 |
| 2012/0167461 A1 * | 7/2012 | Bentzen | | 48/61 |
| 2012/0317982 A1 * | 12/2012 | Klonowicz | | F01K 25/08 |
| | | | | 60/645 |
| 2013/0134720 A1 * | 5/2013 | Fukasaku | | F01C 1/0215 |
| | | | | 290/40 R |
| 2013/0207396 A1 * | 8/2013 | Tsuboi | | H02K 7/1823 |
| | | | | 290/52 |
| 2013/0298568 A1 * | 11/2013 | Pierson et al. | | 60/774 |

FOREIGN PATENT DOCUMENTS

| | | | | |
|---|---|---|---|---|
| DE | WO 2007088194 A2 * | 8/2007 | | F01D 25/22 |
| EP | 2431580 A1 * | 3/2012 | | F01K 25/10 |
| GB | 870808 | 6/1961 | | |
| GB | 883548 | 11/1961 | | |
| JP | 2003274607 | 9/2003 | | |
| KR | 2012013547 A * | 2/2012 | | F01K 25/02 |
| WO | 8202741 | 8/1982 | | |

OTHER PUBLICATIONS

English Translation of KR 2012013547 from K-PION.*
European Search Report for European Patent Application No. 12195282.4 completed Jun. 30, 2014.

* cited by examiner

HERMETIC MOTOR COOLING FOR HIGH TEMPERATURE ORGANIC RANKINE CYCLE SYSTEM

BACKGROUND

The present disclosure relates generally to Organic Rankine Cycle (ORC) systems and, more particularly, to a secondary cooling system therefor.

The Organic Rankine Cycle (ORC) is a vapor power cycle with an organic fluid refrigerant instead of water/steam as the working fluid. The working fluid is heated in an "evaporator/boiler" by a source of waste or low quality heat. The fluid starts as a liquid and ends up as a vapor. The high-pressure refrigerant vapor expands in the turbine to produce power. The low-pressure vapor exhausted from the turbine is condensed then sent back to the pump to restart the cycle.

The simple Rankine cycle used for power generation follows the process order: 1) Adiabatic pressure rise through a pump; 2) Isobaric heat addition in a preheater, evaporator and superheater; 3) Adiabatic expansion in a turbine; and 4) Isobaric heat rejection in a condenser, although other cycle modifications are possible such as the addition of a vapor-to-liquid recuperator.

ORC generators may be hermetic or non-hermetic. Non-hermetic generators do not share the working fluid environment and are typically cooled by air or water. Hermetic generators share and are cooled by refrigerant from the main cycle.

FIG. 1 schematically illustrates a conventional Organic Rankine Cycle system with standard hermetic generator cooling. A small secondary flow of liquid refrigerant is extracted from the pump exit and communicated to the generator casing. In this case the fluid is first fed through a stator cooling jacket and partially boils while picking up heat from stator losses. The remaining two-phase refrigerant is then sprayed into the rotor volume picking up heat from rotor and windage losses. The vaporized refrigerant is then vented downstream of the turbine exhaust.

SUMMARY

An Organic Rankine Cycle (ORC) system according to an exemplary aspect of the present disclosure includes a turbine driven by a working fluid and a generator driven by the turbine. The generator includes a rotor volume at sub-atmospheric pressure, the working fluid sprayed into said rotor volume.

An Organic Rankine Cycle (ORC) system according to an exemplary aspect of the present disclosure includes a secondary cooling flow circuit in communication with a rotor volume at sub-atmospheric pressure, said secondary cooling flow circuit sprays a working fluid into said rotor volume.

A method of operating an Organic Rankine Cycle (ORC) system according to an exemplary aspect of the present disclosure includes spraying a working fluid into a rotor volume at sub-atmospheric pressure.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
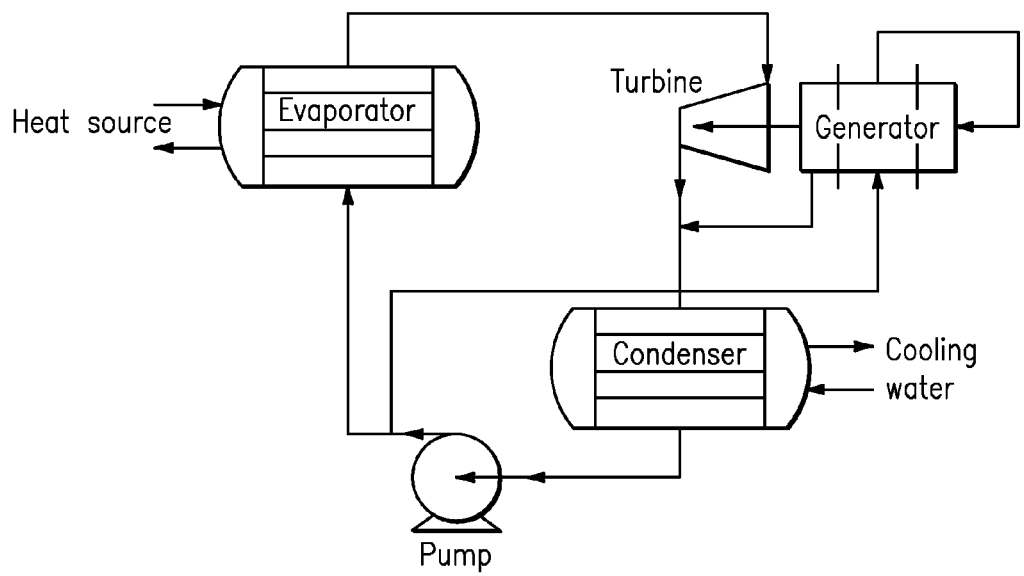
FIG. 1 is a schematic diagram of a RELATED ART organic Rankine cycle in which the low-side saturation temperature is cool enough to provide generator cooling.
Figure 2:
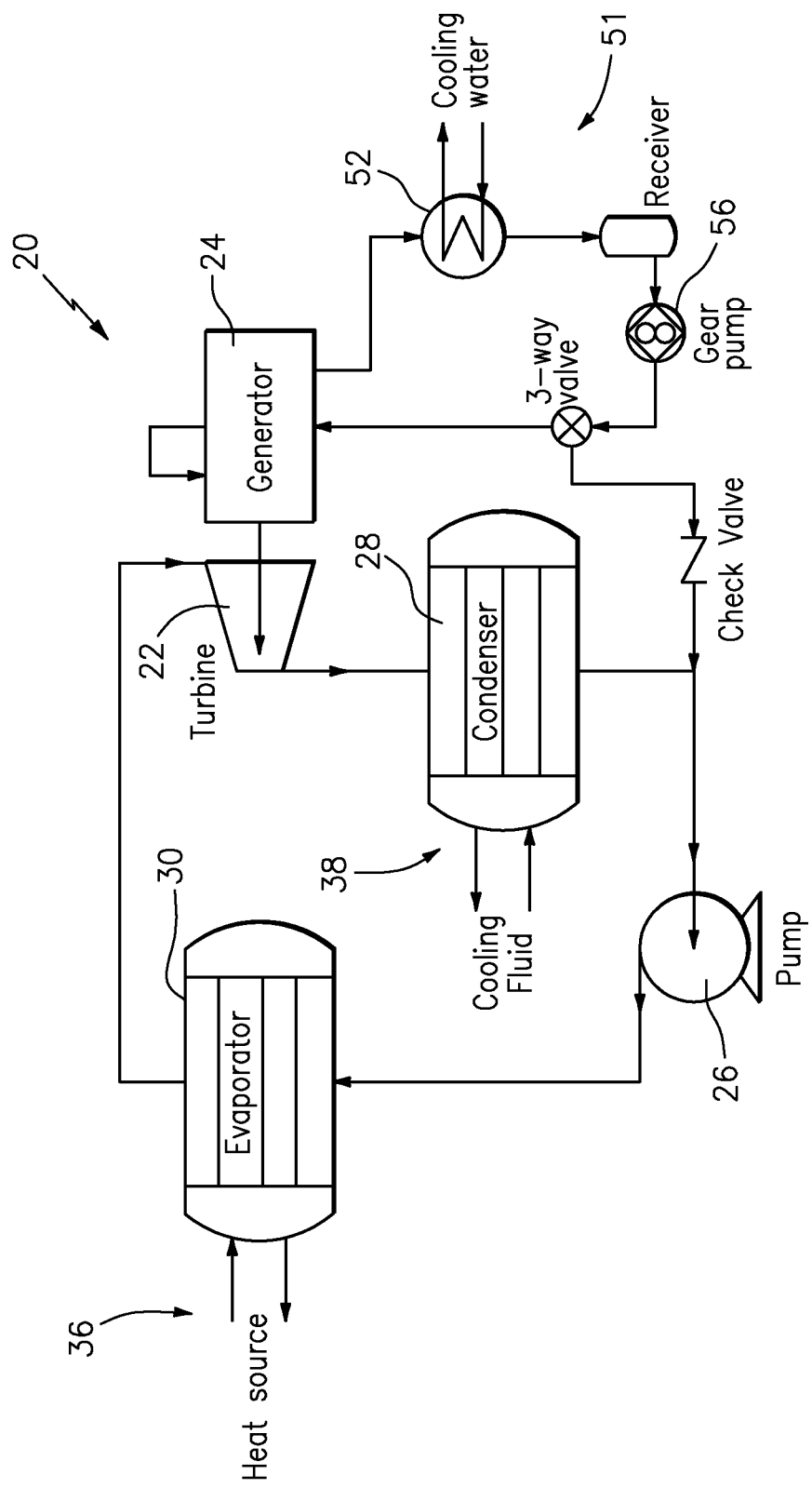
FIG. 2 is a schematic diagram of an organic Rankine cycle system with a low side saturation temperature that is too warm for direct generator cooling and a secondary cooling flow circuit according to one disclosed non-limiting embodiment.

FIG. 2 schematically illustrates an Organic Rankine Cycle (ORC) system 20. The ORC system 20 generally includes a power producing turbine 22 which is driven by a working fluid such as Siloxane MM, NOVEC® 649 (dodecafluoro-2-methylpentan-3-one), or other high boiling point refrigerant. The turbine 22 drives a generator 24 that produces power. A refrigerant pump 26 increases the pressure of the working fluid from a condenser 28. An evaporator 30 such as a boiler receives a significant heat input from a heat source circuit (thermal oil in this example) 36, which vaporizes the working fluid, with the vaporized working fluid then passing through to the turbine 22. Upon leaving the turbine 22, the relatively lower pressure vapor passes to the condenser 28 where it is condensed by way of heat exchange relationship with a cooling fluid system 38. The condensed working fluid is then circulated to the evaporator 30 by the pump 26 to complete the cycle. The cycle through the pump 26, evaporator 30, turbine 22, and condenser 28 is a primary circuit of ORC system 20. It should be appreciated, however, that additional cycles and other fluids may alternatively be utilized.

Figure 3:
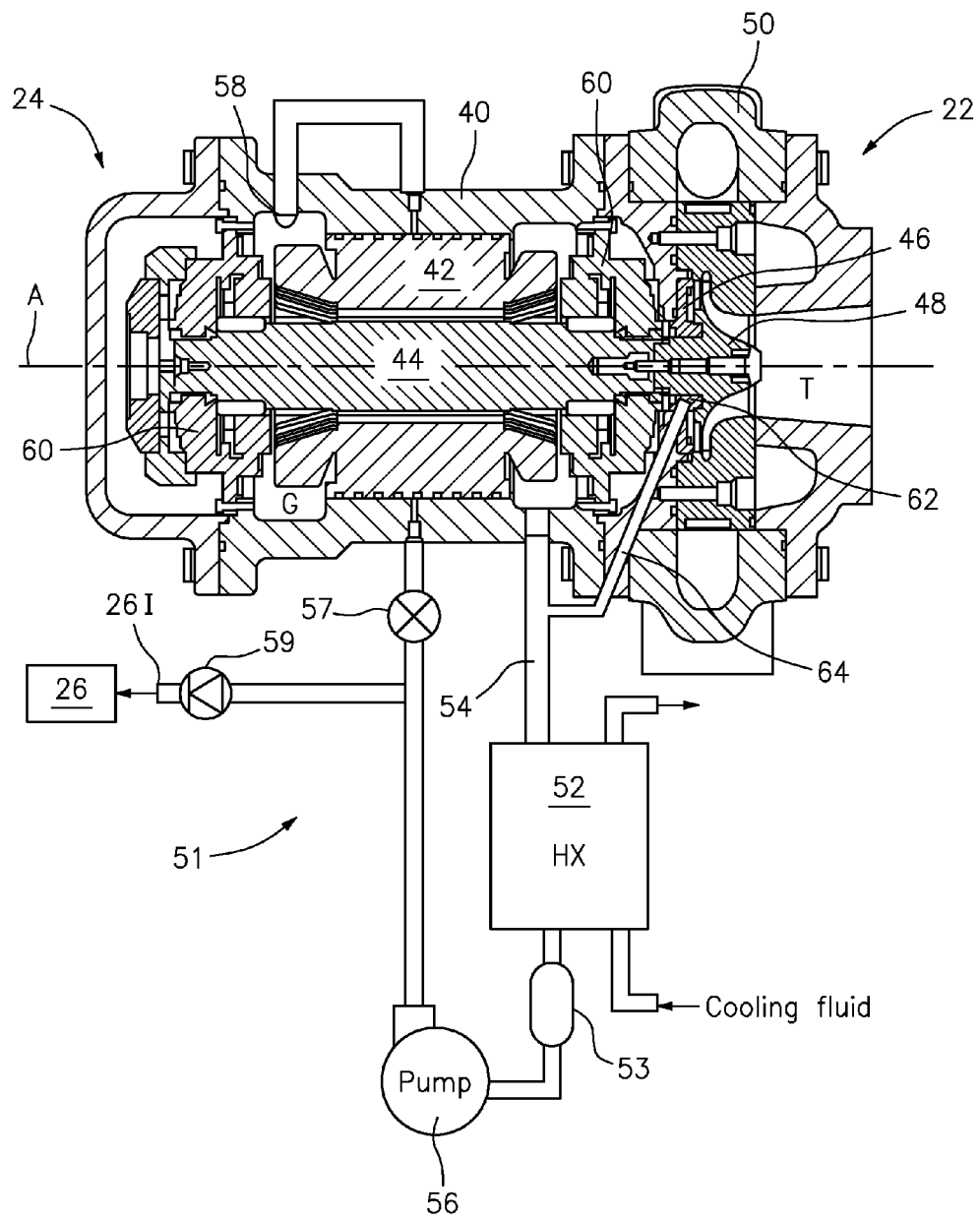
FIG. 3 is an expanded view of a turbine generator of the organic rankine cycle system with a secondary cooling flow circuit.

With reference to FIG. 3, the generator 24 generally includes a housing 40, a stator 42, a rotor 44, and a rotor seal 46. The rotor seal 46 separates the generator 24 from the turbine 22 which generally includes a radial inflow turbine 48, a volute 50 and nozzle, shroud and diffuser. That is, the rotor seal 46 separates a turbine volume T from a rotor volume G. The radial inflow turbine 48 rotates within the turbine volume T about an axis A in response to a working fluid communicated through the volute 50 to drive the generator 24 through the rotor 44. The radial inflow turbine 48 rotates the rotor 44 about the axis of rotation A within the stator 42. The example shown in FIG. 3 is an oil-free, high-speed, direct-drive system with magnetic bearings and no gears, but other embodiments will have the same seal and cooling requirements.

A secondary cooling flow circuit 51 communicates a relatively small amount of the cooling fluid to the generator 24 to provide thermal management thereof. The secondary cooling flow circuit 51 generally includes a cold heat exchanger 52 to condense the working fluid and effectively pull the working fluid out of the housing 40 through a main drain line 54. The cold heat exchanger 52 also receives cooling fluid. The main drain line 54 removes vapor and liquid working fluid from the housing 40 and generates a sub-atmospheric pressure within the rotor volume G.

Below the cold heat exchanger 52 is a receiver tank 53 to accumulate liquid. A pump 56 pumps the condensed/cooled working fluid from the receiver tank 53 to a valve system that consists of a restriction valve 57, and a check valve 59. The restriction valve 57 is varied to set the pressure at the pump exit at the main drain line 54. If the valve 57 is wide open then the pump exit pressure will be only slightly above the rotor cavity pressure in rotor volume G and well below the primary circuit pressure in a primary circuit of flow through the pump 26, evaporator 30, turbine 22, and condenser 28. The check valve 59 will remain closed and no refrigerant will flow through line 26I.

As valve 57 closes, the pump exit pressure rises until it exceeds the primary circuit pressure and refrigerant flows through check valve 59 out of the secondary cooling circuit 51 to the pump 26. This flow is necessary because flow leaks into the secondary cooling circuit 51 through the seal 46 and must be removed or else the secondary cooling circuit 51 may eventually fill up with liquid working fluid. Valve 57 is thus used to control the amount of working fluid in secondary cooling circuit 51.

From valve 57, the liquid working fluid flows into the stator 52 to absorb heat from the stator 42 generated by joule heating, and the liquid working fluid is partially boiled.

The working fluid is then sprayed into the rotor volume G through a nozzle 58. It should be appreciated that one or more nozzles may be circumferentially arranged about the rotor 44. The working fluid that received heat from the stator 42 is now two-phase working fluid. A small pressure drop may be used at the nozzle to disperse the working fluid. As the working fluid is in a saturated environment within the housing 40, the working fluid will be at a temperature determined by its pressure. The working fluid passes between the rotor 44 and the stator 42 and further receives heat generated by windage and rotor internal losses when sprayed toward the rotor 44. The working fluid thereafter collects in the housing 40 and exits to the main drain line 54.

Figure 4:
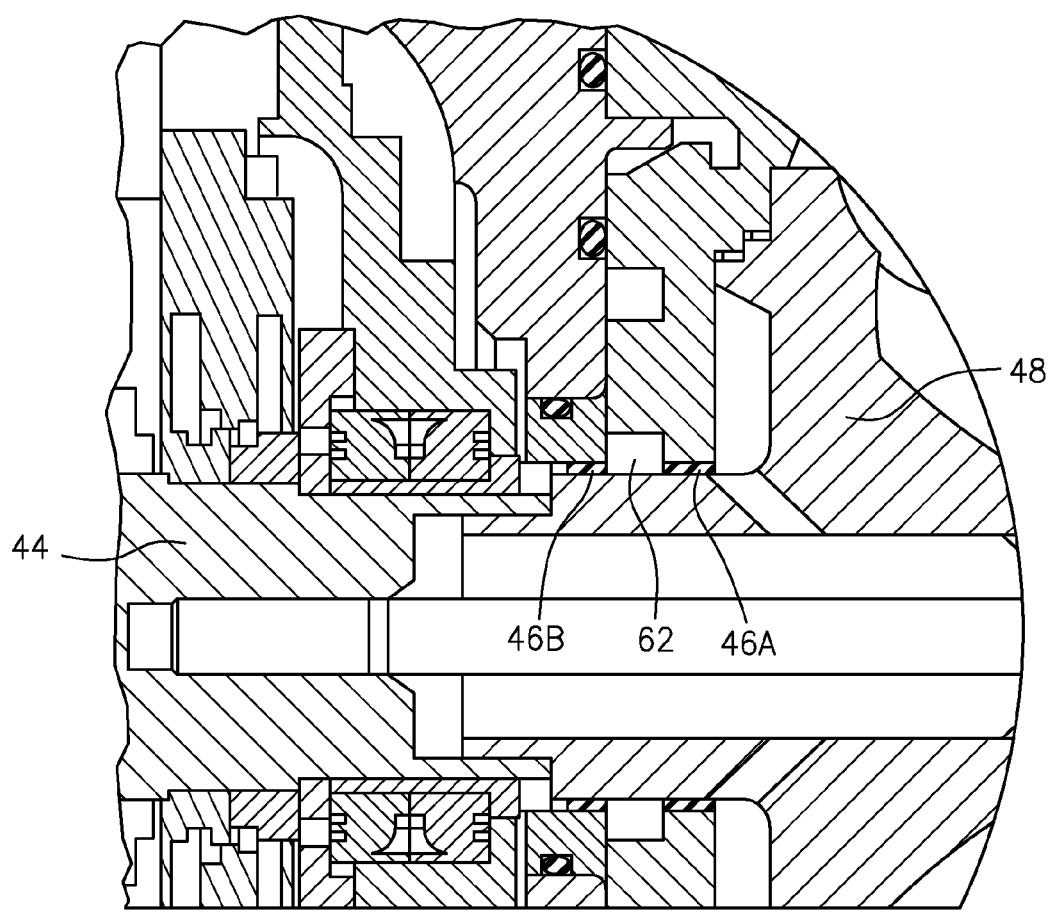
FIG. 4 is an expanded cross-sectional view of a shaft seal with dual labyrinth seals.

With reference to FIG. 4, dual labyrinth seals, 46A and 46B, are used on each side of a circumferential groove 62. In one disclosed non-limiting embodiment, a seal bleed line 64 communicates with the rotor seal 46 to prevent relatively hot vapor from the radial inflow turbine 48 from blowing through the seal 46 into contact with the bearing system 60 which supports rotor 44. In the disclosed, non-limiting embodiment, the circumferential groove 62 delineates the separation between the rotor volume G and the turbine volume T. The circumferential groove 62 is in communication with the seal bleed line 64 to thereby provide a bypass from the rotor seal 46 to the main drain line 54.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. An Organic Rankine Cycle (ORC) system comprising:
    a primary circuit that includes, in flow series, a turbine, a condenser, a first pump, and an evaporator;
    a generator coupled to said turbine and configured to be driven by said turbine, said generator having a rotor volume;
    a secondary cooling circuit that includes, in flow series from the rotor volume, a heat exchanger, a second pump, and a restriction valve located downstream of said second pump and upstream of said rotor volume; and
    a check valve connecting said primary circuit and said secondary cooling circuit and allowing a one-way flow of fluid only from the secondary cooling circuit to the primary circuit,
    wherein said second pump further comprises an outlet that divides into two branches, one of said branches connecting into said check valve and the other of said branches connecting into said restriction valve.

2. The system as recited in claim 1, further comprising a working fluid, said working fluid being Siloxane MM.

3. The system as recited in claim 1, further comprising a working fluid, said working fluid being dodecafluoro-2-methylpentan-3-one.

4. The system as recited in claim 1, wherein said turbine includes a turbine volume,
    the system further comprising a rotor seal which separates said rotor volume from said turbine volume.

5. The system as recited in claim 4, further comprising a bleed line that opens at one end thereof to said rotor seal.

6. The system as recited in claim 5, further comprising a main drain line that opens at one end thereof to said rotor volume.

7. The system as recited in claim 6, wherein said bleed line opens at another end thereof to said main drain line.

8. The system as recited in claim 7, wherein the main drain line extends through the heat exchanger.

9. The system as recited in claim 6, further comprising two labyrinth seals, wherein said rotor seal includes a circumferential groove arranged between the two labyrinth seals, and said bleed line connects to said circumferential groove.

10. An Organic Rankine Cycle (ORC) system comprising:
    a primary circuit that includes, in flow series, a turbine, a condenser, a first pump, and an evaporator, said turbine including a turbine volume;
    a generator coupled to said turbine and configured to be driven by said turbine, said generator having a rotor volume;
    a secondary cooling circuit that includes, in flow series from the rotor volume, a heat exchanger, a second pump, and a restriction valve located downstream of said second pump and upstream of said rotor volume; and
    a check valve connecting said primary circuit and said secondary cooling circuit and allowing a one-way flow of fluid only from the secondary cooling circuit to the primary circuit,
    a rotor seal which separates said rotor volume from said turbine volume;
    a bleed line that opens at one end thereof to said rotor seal;
    a main drain line that opens at one end thereof to said rotor volume; and two labyrinth seals, wherein said rotor seal includes a circumferential groove arranged between the two labyrinth seals, and said bleed line connects to said circumferential groove.

11. The system as recited in claim 10, further comprising a working fluid, said working fluid being Siloxane MM.

12. The system as recited in claim 10, further comprising a working fluid, said working fluid being dodecafluoro-2-methylpentan-3-one.

13. The system as recited in claim 10, wherein said bleed line opens at another end thereof to said main drain line.

14. The system as recited in claim 10, wherein the main drain line extends through the heat exchanger.

* * * * *